3,546,160
SELF-EXTINGUISHING STYRENE/ACRYLO-
NITRILE-COPOLYMERS
Franz-Josef Dany, Hurth, near Cologne, Joachim Kandler, Lechenich, Klaus Frank, Hermulheim, near Cologne, and Hans Weiden, Rodenkirchen, Germany, assignors to Knapsack Aktiengesellschaft, Knapsack, near Cologne, Germany, a corporation of Germany
No Drawing. Filed May 31, 1968, Ser. No. 733,308
Claims priority, application Germany, June 6, 1967,
K 62,479
Int. Cl. C08f 45/56
U.S. Cl. 260—45.7                                           1 Claim

ABSTRACT OF THE DISCLOSURE

Self-extinguishing styrene/acrylonitrile-copolymers obtained by polymerizing the corresponding monomeric compounds in aqueous emulsion with the resultant formation of a latex, precipitating the copolymer from the latex, isolating and drying the copolymer, which comprises stirring into the latex pulverulent red phosphorus as a flame-retarding agent and isolating later from the latex a mixture consisting of the copolymer and red phosphorus.

---

Styrene/acrylonitrile-copolymers have acquired commercial interest because of their relatively high softening point, their impact strength, hardness and resistance to solvents. As compared with standard polystyrenes, a product composed, for example, of 3 parts styrene and 1 part acrylonitrile is found to have an improved dimensional stability under heat, a substantially unlimited resistance to ageing and improved mechanical properties. Their resistance to oils and fats and similar substances and their brilliant outer appearance have made those copolymers a material which is widely used for making household articles, packaging materials and articles for technical uses.

As taught in German Pat. 654,989, an emulsion-made styrene/acrylonitrile-copolymer can be produced, for example, by blending 40 parts of monomeric acrylonitrile with 60 parts monomeric styrene and 200 parts water, the water being used in admixture with 1 part Turkey-red oil and 0.5 parts of the sodium salt of isobutyl-naphthalene-sulfonic acid as an emulsifier. The polymerisation reaction, which shall proceed at a temperature between 70 and 90° C., is initiated by the addition of 3 parts of 30% hydrogen peroxide as a catalyst. During the polymerization reaction itself, the copolymer is found to precipitate as a mass which is soft while hot and hard while cold and which can be made into articles, for example, by injection moulding or moulding in a heatable multiple platen press.

For various fields of application, it is desirable to use plastics which combine incombustibility or self-extinguishing properties with the above favorable physical properties of styrene/acrylonitrile-copolymers which, however, are combustible and for this reason admit only of limited use, for example in building and shipbuilding. The problem underlying the present invention thus is to provide fireproof or self-extinguishing styrene/acrylonitrile-copolymers.

It is generally known that by the addition of compounds containing phosphorus and/or halogen plastics can be made with more or less great success to have flame-retardant properties. In French Patent 1,440,823 it has been reported that the combustibility of a methyl methacrylate/vinyl chloride-copolymer can be reduced by incorporating therewith, for example, 25% by weight of trichloroethyl-phosphate. The compounds of antimony or boron are further substances capable of producing a flame-retarding effect. In addition to producing this desirable effect, the above substances as plastics additives are often found to have the disadvantage of impairing the plastics' physical properties.

A further process for the production of self-extinguishing plastics has been described in German Patent 1,173,-641, wherein foam plastics containing urethane groups are rendered fireproof by the incorporation of red phosphorus and, if desired, of a halogen-containing organic compound. As taught therein, the red phosphorus, which can be added in powder form in a proportion between 0.05 and 20% by weight to the foam batch, reduces the burn-up length of the foam plastics up to self-extinction or reduces at least their burn-up velocity.

Extensive experiments have shown that the use of a conventional fire-retarding agent applied to different substrates produces inconsistent results in respect of the protective effect to be expected and the change in the substrate's properties. It has also been found that the quantity and particle size of the flame-retarding agent in the substrate as well as the method of incorporating the said agent into the substrate are factors which are critical for producing an optimum protective effect. In other words, the mere qualitative knowledge acquired in respect of a flame-retarding agent is no satisfactory basis to rely on for rendering a given substrate fireproof without impairing its initial properties.

The present invention relates more especially to a process for the manufacture of self-extinguishing styrene/acrylonitrile-copolymers by polymerizing the corresponding monomeric compounds in aqueous emulsion with the resultant formation of a latex, precipitating the copolymer from the latex, isolating and drying the copolymer, which process comprises stirring into the latex pulverulent red phosphorus as a flame-retarding agent and isolating later from the latex a mixture consisting of the copolymer and red phosphorous.

In accordance with a further feature of the present invention the red phosphorus is stirred into the latex in a maximum proportion of about 8% by weight, preferably about 1 to 6% by weight, referred to the solid matter content of the latex. The red phosphorus is preferably stirred into the latex within a period of time between 8 and 15 minutes while maintaining a stirring velocity of about 60 to 400 revolutions per minute.

An especially good flame-retarding effect is produced by using the pulverulent red phosphorus in the form of particles with a maximum size of about $60\mu$, preferably $20\mu$.

The present invention is thus limited to the use of red phosphorus as a flame-retarding agent for styrene/acrylonitrile-copolymers and to the methods of incorporating the flame-retarding agent into the copolymer. In other words, the steps comprising producing the styrene/acrylonitrile latex, precipitating the copolymer from the latex and drying the precipitated copolymer do not form part of the present invention. These steps can be carried out, for example, in the manner disclosed in U.S. Pat. 2,820,-773.

Although foam plastics containing urethane groups have been reported in German Patent 1,173,641 to be rendered fireproof by the incorporation of powered red phosphorus, it has not been possible simple to apply the technical teachings of that patent to the problem underlying the present invention, in the absence of any suggestion, for example, in respect of the particle size in which to use the red phosphorus. The reason for this is that red phosphorus having a particle size greater than $60\mu$ has been found to affect the physical properties of the styrene/acrylonitrile-copolymer, whereas red phosphorus with a preferred maximum particle size of $20\mu$ has been found to produce very favorable effects. Red phosphorus with a particle size of less than $60\mu$ is already pyrophorus. Therefore, it first appeared hazardous to use the phosphorus in such form. However, it has unexpectedly been found that such finely divided phosphorus can be safely introduced into and suspended in the latex without any change of the $p_H$-value of the emulsion, that could give rise to premature coagulation of the latex. Also the technical treatment of the stabilized copolymer, carried out at tempeatures of up to 300° C., i.e. within the range of the phosphorus flash point, could not be found to affect the copolymer, as compared with polymers free from additives. The electrical resistance and surface conductivity of the finished process product have been tested and the same results as those determined for phosphorus-free plastics have been obtained. These observations admit of the conclusion that every red phosphorus particle is encapsulated by plastics particles and that the phosphorus particles are homogeneously distributed in the plastics.

Plastics containing certain proportions of incorporated red phosphorus were tested and were unexpectedly found to have an improved tensile strength and flexural strength. In other words, the copolymer having red phosphorus incorporated therewith in accordance with the present invention was found to combine self-extinguishing properties with improved physical properties. Needless to say this is an unexpected result which could not be foreseen.

The self-extinguishing copolymer in accordance with the present invention can be produced, for example, by subjecting an aqueous emulsion of monomeric styrene and acrylonitrile, which has been prepared in customary manner by means of a suitable emulsifier, to polymerization in contact with a polymerization catalyst to produce a latex with a solid matter content of 30% by weight, for example, by stirring powdered red phosphorus later into the latex so made, the stirring velocity being selected so as to produce very strong shearing forces and thereby to obviate coagulation of the polymer. After intense mixing of the phosphorus and latex, the plastics is precipitated either by shifting the $p_H$-value of the emulsion to the acid range or by increasing the stirring velocity, and the phosphorus-containing copolymer is isolated and dried, if desired under reduced pressure. The resulting fireproof coagulate was capable of being shaped by extrusion, granulation or injection moulding under customary pressures between 50 and 1000 kp/square centimeter and at temperatures between 200 and 300° C.

EXAMPLES 1 TO 7

The test results numbered 1 to 6 in the table hereinafter were obtained by blending 70 parts styrene, 30 parts acrylonitrile and 0.36 parts of a mixed tertiary alkyl mercaptan containing from 12 to 16 carbon atoms in the alkyl radical with a solution comprising 200 parts water, 0.03 parts potassium persulfate, 0.01 part sodium bisulfite and 2 parts of an alkylaryl sulfonate as an emulsifier. The blend so made was polymerized at 50° C. for 4 hours, while stirring, at a velocity of 200 to 250 revolutions per minute, and a latex was obtained from which the copolymer was separated later by acidification with acetic acid. After separation and drying, the copolymer was made into a shaped specimen which was used in the fire test.

In experiments 2 to 6, a definite proportion of pulverized red phophorus had been stirred into the latex, prior to precipitation of the copolymer, and in experiment 7 the pulverulent copolymer had been dry-blended with red phosphorus.

The following table indicates that the incorporation of red phosphorus resulted in a reduced burn-up velocity and self-extinguishing properties for the styrene/acrylonitrile-copolymer specimen. The specimen's physical properties, such as tensile strength and flexural strength, were unexpectedly found to have been improved given that the red phosphorus had been stirred into the plastics latex rather than dry-blended with the plastics powder.

TABLE

| Experiment No. | Material tested | Fire test ASTMD 635-56 T | | Tensile strength, DIN 53455 | Flexural strength, DIN 53452 |
|---|---|---|---|---|---|
| | | Burn-up velocity (mm. per minute) | Self-extinction after mm. burnup length | | |
| 1 | Styrene/acrylonitrile specimen | 35.2 | | 1 | 1 |
| 2 | Styrene/acrylonitrile specimen+1% by weight red phophorus | 24.6 | | 1.15 | 1.1 |
| 3 | Styrene/acrylonitrile specimen+2% by weight red phosphorus | 22.6 | | 1.2 | 1.1 |
| 4 | Styrene/acrylonitrile specimen+4% by weight red phosphorus | | 5 | 1.25 | 1.20 |
| 5 | Styrene/acrylonitrile specimen+6% by weight red phosphorus | | 2 | 1.2 | 1.1 |
| 6 | Styrene/acrylonitrile specimen+8% by weight red phosphorus | | 6 | 0.75 | 0.70 |
| 7 | Styrene/acrylonitrile specimen+4% by weight red phosphorus | | | 0.9 | 0.0 |

I claim:
1. A self-extinguishing styrene acrylonitrile copolymer material obtained by
 (a) polymerizing the corresponding monomeric components in aqueous emulsion to effect a latex;
 (b) admixing the latex with up to about 8% by weight based upon the solid content of pulverulent red phosphorus having a maximum particle size of about $60\mu$;
 (c) precipitating the copolymer from said latex in combination with the phosphorus; and recovering the resulting self-extinguishing copolymeric composition.

References Cited
UNITED STATES PATENTS

| 2,673,193 | 3/1954 | Kolvoort | 260—92.8 |
| 2,964,083 | 12/1960 | Pfau et al. | 152—330 |
| 2,964,490 | 12/1960 | Howland et al. | 260—41.5 |
| 3,269,963 | 8/1966 | Ilgemann et al. | 260—2.5 |
| 3,294,712 | 12/1966 | Clark et al. | 260—2.5 |
| 3,322,716 | 5/1967 | Klein et al. | 260—45.7 |
| 3,326,832 | 6/1967 | Rauschenbach et al. | 260—28.5 |
| 3,373,135 | 3/1968 | Jenkner et al. | 260—45.7 |

DONALD E. CZAJA, Primary Examiner

R. A. WHITE, Assistant Examiner

U.S. Cl. X.R.

260—85.5